Dec. 2, 1958　　　　　F. GUILLOU　　　　2,862,732
TUBE COUPLING HAVING A PUSHED-WEDGE TYPE PACKING
Filed May 17, 1954
Fig. 1
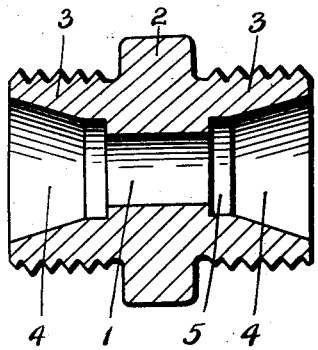
Fig. 2
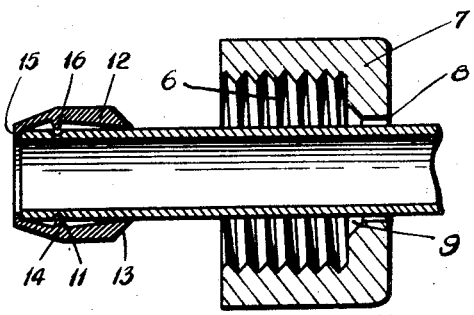
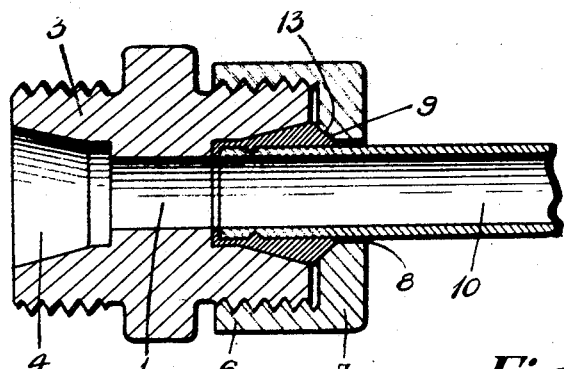
Fig. 3
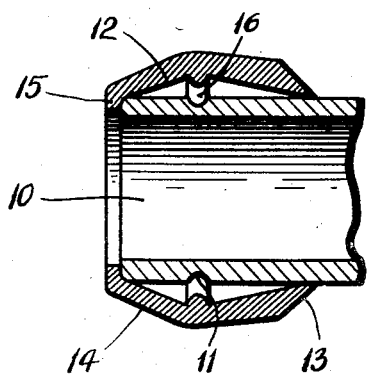
Fig. 4
INVENTOR
Francois GUILLOU
BY
ATTORNEYS

2,862,732

TUBE COUPLING HAVING A PUSHED-WEDGE TYPE PACKING

François Guillou, Nantes, Loire-Inferieure, France

Application May 17, 1954, Serial No. 430,354

1 Claim. (Cl. 285—342)

The present invention relates to improvements in union-joints and more especially concerns tubing adapted to pipe fluids under high pressure.

It deals with a method of uniting one portion of a tube with another or of jointing a pipe with a container or the like by using yielding or plastic material such as soft metal or the like. This method consists in fitting the end of the pipe or the two pipe-ends to be coupled or connected with a circular collar or thimble adapted to be a leak- and pressure-proof part that is to be squeezed into its final shape and place and made to fit into corresponding grooves, circular or otherwise, located on the tube-end, the jointing being effected when the different members are screwed and pressed into position.

This jointing process results in making leak- and pressure-proof one or more points round the pipe-end or ends to be connected or united with each other. Thus the coupling is effected with the least strain from the operator. The jointing is the more efficient proof against leak or pressure as the above-mentioned collar or thimble is externally cone-shaped, so that when pressed into place, its conical surface comes into tight contact with the corresponding surfaces of the members utilized in the coupling, and again the coupling and jointing will be still more effective if said collar or thimble is provided with one or several flanges or ribs round its inner end making all-round contact with sectional profile of pipe, thus increasing the surface of contact of said pipe with the members by which the collar- and pipe-assembly is secured, corresponding grooves or the like being provided for said flanges or ribs to locate themselves in, as the collar is pressed into position under screwing strain.

Moreover the thimble- or collar-end being inwardly flanged makes it impossible for said end to misplace itself in the process of assembly, as is often the case with the usual, similar means utilized in the coupling of pipes.

Another characteristic of the present invention is to provide a collar or thimble the initial shape of which is such that the diameter of its internal ribs, these being annular or otherwise, is somewhat larger than the external diameter of the pipe-end upon which said collar or thimble is to be forced into initial position, thus leaving a clearance between the outer surface of said pipe-end and inner surface of said collar or thimble.

Whereas the usual method of jointing requires abnormal crushing force to be exercised upon the means employed to make the joint perfectly leak-proof, especially in the case of the pipe-end presenting uneven surfaces due to deterioration, the collar or the like as provided in the present invention can easily and correctly be put into place over the end of the pipe even though the latter is roughly cut or pitted with rust-marks or presents any traces of previous welding or soldering, the collar or the like being externally cone-shaped makes it possible for the assembly to be such that said collar exerts an all-round, steady pressure upon the pipe-end and also that the internal ribs tightly fit into their several grooves on the tube-end, the assembly being made leak- and pressure-proof without it being necessary for much tightening to be effected; whereas other means, such as gaskets, washers and the like, hitherto employed in the jointing, sometimes may in the process of assembly, be displaced and even block the whole or part of the bore of the pipe or muff, the collar or thimble according to the present invention is invariably kept in its right position by the flange provided round its inner end into which the rugged sectional profile of the pipe-end is pressed and by the other ribs that are also pressed into their respective grooves.

Moreover, inside the coupling muff or round one end of the opposite collar or thimble, there is provided a cylindrical shoulder for the collar-end to abut thereon, said shoulder preventing the collar from forcing its way into the bore of the pipe.

Contrary to hitherto utilized methods, the coupling or jointing according to the present invention being effected under comparatively small strain in the process of assembly, the method herein described provides a means especially suitable in the case of uniting tubes the walls of which may be thinner than usual, and likewise pipes made of soft metal such as copper, brass, aluminium and their alloys. For the above reason again, the method of coupling or jointing according to the present invention is absolutely suitable for piping adapted to be subjected to high pressure, said method making it possible to proceed with great accuracy and speed.

In one of the several embodiments of the invention herein described, a muff is made use of for coupling purposes, said muff having conical bores, said bores each having the shape of a truncated cone with its larger base located at the end of the muff, said muff being threaded and capable of having a collet screwed on to it.

A preferred form of the collar or thimble when initially positioned on the pipe-end is double cone-shaped, the two smaller bases of the truncated cones thus formed being placed at both ends of the collar, one of said ends having a flange abutting on the sectional profile of the pipe and the other tapering away. As the pipe-end fitted with its collar is inserted into the conical bore of the muff, the flanged end of said collar abuts on the above-mentioned shoulder whereas its tapering ends abuts on a corresponding bevel or chamfer provided on the collet. The screwing of said collet results in the squeezing of the collar or thimble into its final shape and position so that said collar comes into tight contact with both the pipe-end and the conical surface of the muff.

Welding or screwing or any adequate method of connection may be used, yet in any case, one can make use of the union-joint according to the present invention. In the case of a breeches-pipe or a three- or four-way outlet being required, the various bores whether identical or differing in diameter are merged into a single passage within the coupling muff and into each conical bore as previously described a pipe may be inserted and screwed into position according to the above-mentioned method. The same can be applied to star-shaped assemblies of pipes or to an end-to-end coupling.

The ribs provided around the surface of the collar may be devised in many different ways. A preferred form being the annular one as it can most easily fit into corresponding grooves round the pipe-end.

The pipe or the main part of the collar or thimble come into tight contact with each other through said annular ribs with the result that the collar or thimble grips the pipe-end more effectively.

It is with a view to simplifying that herein is described and illustrated only the case of a pipe-end provided externally with one annular groove, said groove forming a female part, and with a collar or thimble round the bore of which is provided a rib, said rib protruding round the inner surface of the collar and thus forming a male part. The rib is made to fit into appropriate grooving cut out round the pipe-end and corresponding to said rib as the collar or thimble is forced into its final shape and position in the process of assembly.

Still within the scope of the invention herein described, it will be apparent that the relative roles of the male and female members may be inversely made use of. This allows of two different ways of using said members with a view to the same result which is the assembly made possible by the improvement herein described. Thus the collar or thimble may be provided with flanges or ribs or the like which are to fit into appropriate grooving cut out on the pipe-end, or, inversely, the pipe-end may carry same flanges or ribs made to fit into adequate grooving or rifling provided on the collar or thimble.

In the drawings a form of pipe-jointing according to the present invention is shown as follows:

Fig. 1 is a side view seen in cross-section of a two-way coupling muff.

Fig. 2 is a side view seen in cross-section of a threaded collet to be screwed upon above-mentioned coupling muff, showing a pipe-end fitted with its collar or thimble.

Fig. 3 shows the parts mentioned above in Figures 1 and 2 screwed in their final relative positions.

Fig. 4 is an enlarged cross-section of the pipe-end with its collar or thimble.

Referring now more specifically to the drawings, the coupling muff is shown as being provided externally in its centre with adequate surfaces 2 for screw-spanner and internally with a bore 1 and has both ends threaded, the conical bores 4 having each a cylindrical shoulder 5 at the inner end. The pipe-end 10 with its collar is located in this conical aperture as shown in Figure 3 and the collet 7 is screwed by means of its internal thread 6 on to the threaded external part of coupling muff 3 the collet 7 being shaped externally like a hexagonal nut and having a central bore 8 provided internally with a chamfer 9.

Near the pipe-end 10 to be connected, there is provided in the wall of the pipe externally an annular groove 11 and the pipe-end is fitted with a collar or thimble 12 made of material that will yield under pressure and devised with two conical surfaces 13 and 14 by which contact is made between said collar and the conical bore 4 of the coupling muff. A flange 15 turned towards the inside and formed by the turned-in end of the collar is adapted to engage the sectional profile of the pipe and the cylindrical shoulder 5 of the muff. Round the collar internally there is provided a rib 16 which is at the same distance from the terminal flange 15 as the groove 11 is from the pipe-end 10 so that said rib 16 can fit into said groove. Flange 15, being solid with the collar or thimble and mounted adjacent both the sectional profile of the pipe-end and the shoulder 5 provides a first efficient joint after the final tightening is given. The contact of conical surfaces of both collar and coupling muff make a second leak- and pressure-proof joint and so does the fitting of rib 16 into groove 11 and a third joint is created by the pressure brought to bear by chamfer 9 upon the outer end 13 of the collar or thimble.

What I claim is:

A pressure-proof pipe coupling comprising before assembly: a pipe having a groove made in the outer surface thereof near its end; a plastically deformable integral collar made of a material of a hardness at most equal to the hardness of the material of said pipe, said collar presenting an inner surface with a diameter at its ends equal to the outer diameter of the pipe and a gradually increasing diameter at the portions intermediate the ends, an inwardly projecting radial flange at one end, an inner rib spaced from said flange by a distance equal to the distance of said groove from the end of said pipe, and an outer surface having a frusto-conical portion at the end opposite said flange, a central generally cylindrical portion and a second frusto-conical portion at the end adjacent said flange, said second frusto-conical portion being generally parallel to a corresponding frusto-conical portion of the inner surface; an externally threaded fitting member having a bore presenting a radial annular shoulder with inner diameter smaller than the outer diameter of said pipe and with outer diameter equal to the diameter of the edge between said flange and said second frusto-conical outer surface portion of said collar, a cylindrical portion adjacent the outer edge of said annular shoulder and extending axially a distance smaller than the distance of said groove from the end of said pipe, and a divergent frusto-conical shoulder portion extending axially from said annular shoulder a distance smaller than the distance of the end of said central outer surface portion of said collar adjacent said first frusto-conical outer surface portion of said collar from said flange; and an internally threaded collet adapted to engage said externally threaded fitting member, said collet having a bore presenting a frusto-conical portion of inclination and length generally equal to that of said frusto-conical outer-surface portion of said collar, the volume of said collar being larger than the combined volumes of said bores of said fitting member and said collet exclusive of the volume of the cylindrical portions of said bores corresponding in diameter to said pipe; in assembled condition the outer face of said flange abutting said annular shoulder, said frusto-conical outer surface portion of said collar abutting the frusto-conical bore portion of said collet, said rib fitting in said groove, and the annular space between said pipe and the cylindrical and frusto-conical bore portions of said fitting member being completely filled by the deformed material of said collar.

References Cited in the file of this patent

UNITED STATES PATENTS

| | | |
|---|---|---|
| 625,155 | Dresser | May 16, 1899 |
| 1,193,853 | White | Aug. 8, 1916 |
| 2,081,021 | Smith | May 18, 1937 |
| 2,179,127 | Lauer | Nov. 7, 1939 |
| 2,251,717 | Parker | Aug. 5, 1941 |
| 2,269,695 | Scharf | Jan. 13, 1942 |
| 2,556,694 | Husted | June 12, 1951 |
| 2,613,959 | Richardson | Oct. 14, 1952 |
| 2,644,700 | Woodling | July 7, 1953 |
| 2,687,315 | Courtot | Aug. 24, 1954 |
| 2,695,796 | Woodling | Nov. 30, 1954 |